J. D. JONES.
Seed-Drill Teeth.
No. 49,883
Patented Sept 12, 1865.
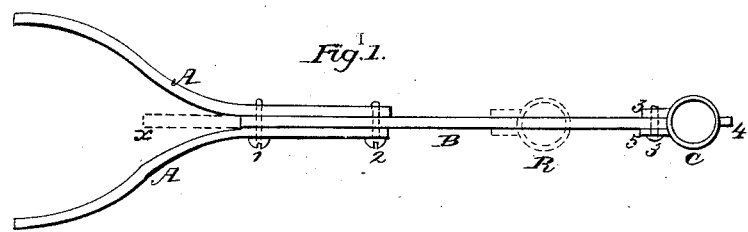
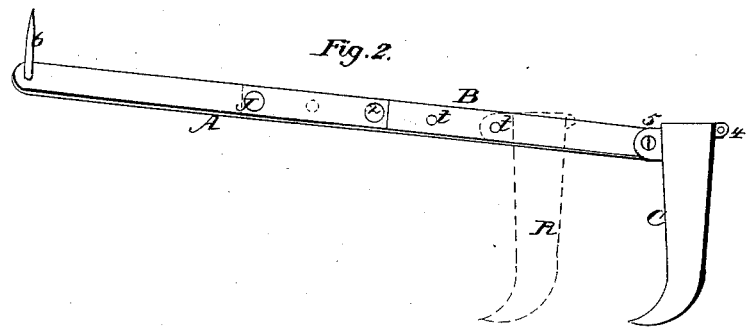
Witnesses:
James J. Johnston.
M. M. Gormigle
Inventor:
James D. Jones

UNITED STATES PATENT OFFICE.

JAMES D. JONES, OF PITTSBURG, PENNSYLVANIA.

ADJUSTABLE DRAG-BAR FOR GRAIN-DRILLS.

Specification forming part of Letters Patent No. 49,883, dated September 12, 1865.

*To all whom it may concern:*

Be it known that I, JAMES D. JONES, of Pittsburg, in the county of Allegheny and State of Pennsylvania, have invented a new and useful Improvement in Adjustable Drag-Bars and Teeth for Grain-Drills; and I do hereby declare that the following is a full and exact description thereof, reference being had to the accompanying drawings, and to the letters of reference marked thereon.

The nature of my invention consists in making a new article of manufacture, to wit: an adjustable drag-bar and teeth for grain-drills, the same being constructed, arranged, and operating in the manner hereinafter described.

To enable others skilled in the art to make and use my improvement, I will proceed to describe its construction and operation.

In the accompanying drawings, Figure 1 represents a top view of the drag-bar and tooth. Fig. 2 represents a side view of the same.

In the drawings, A represents two flat bars of iron, which are bent in the form represented in Fig. 1 and are furnished with bolt-holes.

B represents a straight and flat bar of iron, which is furnished with bolt-holes, marked $t$, the distance between which correspond to the distance between the bolt-holes in the bar A.

1, 2, and 3 represent bolts.

C represents an ordinary tooth for grain-drills. The tooth C is attached to one end of the bar B by means of the bolt 3, which passes through the lugs marked 5 and the bar B. The lug marked 4 on the back part of the tooth is used for attaching the elevating-chain to the tooth. The bars A are spread apart in the manner represented in Fig. 1, for the purpose of bracing the drag-bar sidewise.

The size of the iron used in constructing my improved drag-bar I leave to the good judgment of the mechanic, and the mode of forming and constructing the same will be readily understood by reference to the accompanying drawings.

The operation of my improvement is as follows: I attach the parts A to the front cross-bar of the frame of the grain-drill by means of staples 6, which are put through holes made in the front end of the bars A and driven into the cross-bar of the frame of the grain-drill. When I wish to shorten the drag-bar I remove the bolts 1 and 2 and move the bar B forward between the bars A, as indicated by the dotted lines $x$, which will bring the tooth to the point indicated by the dotted lines R. I then replace the bolts 1 and 2, and by them secure the parts firmly together.

The advantages of my improvement are, the teeth of grain-drills can be arranged in rows, set in the straggling form or set on an oblique line to the axle of the drill, thereby enabling the farmer to adapt his machine to the kind and condition of soil into which he desires to drill the grain.

Having thus described the nature, construction, operation, and advantages of my improved drag-bar, what I claim as of my invention is—

A new article of manufacture, to wit: an adjustable drag-bar for grain-drills, said bar consisting of parts A and B, constructed, arranged, and operating substantially in the manner herein described, and for the purpose set forth.

JAMES D. JONES.

Witnesses:
JAMES J. JOHNSTON,
ALEXANDER HOYT.